Figure 1:
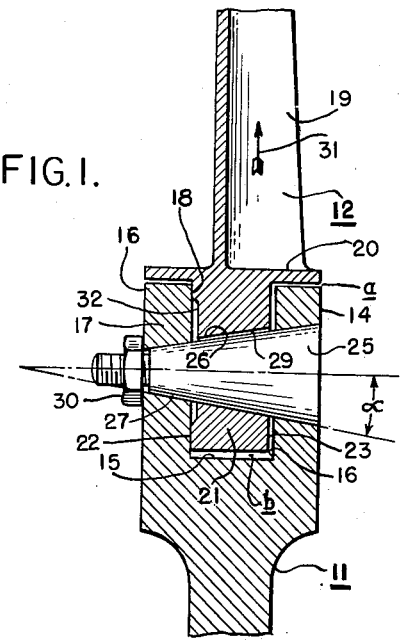

Feb. 7, 1961 R. P. KROON 2,970,809
BLADE VIBRATION DAMPING ARRANGEMENT FOR ELASTIC FLUID MACHINES
Filed Aug. 29, 1958

INVENTOR
REINOUT P. KROON
BY Frank Cristiani Jr.

United States Patent Office 2,970,809
Patented Feb. 7, 1961

2,970,809

BLADE VIBRATION DAMPING ARRANGEMENT FOR ELASTIC FLUID MACHINES

Reinout P. Kroon, Wallingford, Pa., assignor to Westinghouse Electric Corporation, East Pittsburgh, Pa., a corporation of Pennsylvania Filed Aug. 29, 1958, Ser. No. 758,052

6 Claims. (Cl. 253—77)

This invention relates to vibration damping, more particularly to an arrangement for damping vibrations in blades for turbines, compressors and the like, and has for an object to provide a simplified yet highly effective arrangement of this type.

It is a further object of the invention to provide a blade anchoring arrangement which provides mechanical damping of vibrations induced in the blade during operation.

As is well known in the art, during certain operation conditions of an elastic fluid utilizing machine, such as a turbine or compressor, there exist exciting forces tending to cause blade vibration. Unless sufficient damping forces are present, the vibration can be serious enough to result in blade failures.

In accordance with the invention, the above blade vibrations are minimized by providing a rotor structure comprising a rotor disc, for example, having an annular groove formed in its periphery adapted to receive an annular row of radially extending blades. Each of the blades is provided with a root portion having opposite parallel faces mating with the annular side walls of the recess and loosely fitted therein to permit a limited degree of movement normal to the side walls, as well as a limited degree of tilting or rocking about the axis of the blade.

Each of the blades is anchored in place by a pin extending transversely through the side walls of the recess and the blade root portion. The pin has a substantially frusto-conical surface portion slidably engaging a frusto-conical bore in the blade root and extending transversely to the blade axis.

Accordingly, during operation, the rotary speed of the blades creates centrifugal forces biasing the blades in radially outward direction and absorbed by the anchoring pin. This centrifugal force causes the blade to frictionally bear against the radially inner surface of the anchoring pin and further exerts a component directed toward the apex of the frusto-conical portion of the pin, thereby causing the blade to move towards the apex and frictionally bear against the associated side wall of the recess.

The cone angle is made sufficiently small to permit some rotation of the blade about the pin, yet sufficiently large to produce substantial side forces on the blade root. In this manner, a high degree of damping is attained while the blade vibrates. With the above arrangement, a high degree of vibration damping is attained. According to calculations, with a cone angle of from three degrees to seven degrees, adequate vibration damping of the blade may be obtained under typical conditions.

Figure 2:
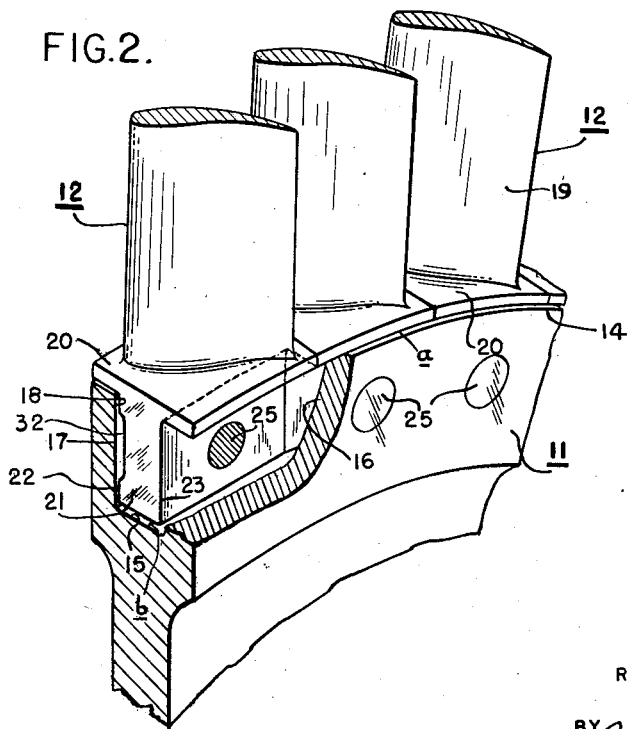

The foregoing and other objects are effected by the invention as will be apparent from the following description and claims taken in connection with the accompanying drawings, forming a part of this application, in which:

Fig. 1 is a sectional view illustrating a blade and a portion of a rotor disc incorporating the invention; and Fig. 2 is a perspective view, illustrating a plurality of blades and a portion of the rotor disc with a portion cut away for clarity.

Referring to the drawing, there is shown a portion of a rotor structure for a rotary elastic fluid utilizing machine such as a turbine or compressor including a disc member 11 having mounted thereon an annular row of radially outwardly extending blades 12. The disc member 11 is provided with an annular rim portion 14 having an annular recess 15 formed therein to receive the blades 12. The recess 15 is partially defined by a pair of opposed parallel side walls 16 and 17 which extend radially outwardly to the peripheral edge of the disc, so that an annular access opening 18 is defined thereby.

As illustrated, each of the blades 12 is provided with the usual airfoil-shaped vane portion 19, a generally rectangular platform portion 20, and a root or anchoring portion 21. The root portion 21 is of generally parallelepiped shape with oppositely disposed parallel surfaces 22 and 23 disposed in juxtaposition with the recess side walls 17 and 16, respectively. However, the thickness of the root portion 21 is slightly less than the width of the recess so that the blade is free to move in a direction normal to the side walls thereof, that is, in a direction parallel to the axis of the disc, for a reason which will subsequently be described. In addition, some clearance indicated at $a$ is provided between the platform 20 and the rim portion 14, as well as at $b$ between the blade root 21 and the bottom of the recess 15.

The blade 12 is supported in the disc 11 by an anchoring pin 25 which extends through suitable aligned openings formed in the side walls of the disc and a bore 26 formed in the root portion of the blade. In accordance with the invention, the pin 25 is disposed with its longitudinal axis extending normal to a radial plane disposed normal to the axis of the disc and has a frusto-conical portion 27 formed by a line of revolution disposed at an angle $\alpha$ with the axis of rotation. For clarity the angle $\alpha$ is hereinafter termed the cone angle. The bore 26, in a similar manner, is formed with a conical surface 29 having a cone angle which is substantially identical to the conical angle $\alpha$ of the pin. The pin 25 may be firmly locked to the disc 11 in any suitable manner, as, for example, by a nut 30. It will further be noted that the conical bore 26 is slightly larger in diameter than that of the conical surface 27, so that the blade 12 is free to move axially of the pin from side to side in the recess to a limited degree, as well as to rotate about the axis of the pin.

In operation, as the disc assembly 10 rotates about its axis, it induces centrifugal forces on the blade 12 which are exerted in a radially outward direction, as indicated by the arrow 31, thereby biasing the blade outwardly and against the radially inner surface of the pin, as illustrated in Fig. 1. These forces provide a component of force directed along the conical surface of the pin, urging the blade root towards the apex of the cone, until further movement is arrested by sliding abutment of the root surface 22 with the recess side wall 17. Accordingly, since the blade is free to rock in the recess and since the centrifugal forces urge the root against the side wall 17 of the recess, considerable damping is attained by the sliding friction between the blade root and the disc.

In addition to the above, the frictional characteristics may further be enhanced by forming a recess 32 in the face 22 of the root, thereby to increase the moment arm of the frictional forces. Here again, the area of surface 22 may be ascertained or selected to suit the various types of material utilized in the application of the invention.

The optimum angle $\alpha$ depends on the dimensions of the blade, its material, the radius at which it is mounted and the r.p.m. of the machine, as well as the coefficient of friction of the blade and disc material. However, it has been determined that under typical conditions, optimum damping is attained when the angle α is selected within the limits of three degrees to seven degrees.

It will now be seen that the invention provides a highly simple but effective damping arrangement for a blade of an elastic fluid utilizing machine. It will further be seen that the invention provides a blade locking arrangement which inherently provides damping characteristics to the blade without additional modifications of the blade.

As illustrated, the blade is of the solid type. However, the invention may be utilized in conjunction with other types of blade, such as hollow blades, if desired, with equally beneficial results.

While the invention has been shown in but one form, it will be obvious to those skilled in the art that it is not so limited, but is susceptible of various changes and modifications without departing from the spirit thereof.

What is claimed is:

1. A rotor structure having a rim portion, said rim portion having a recess formed therein, a radially extending blade having a root portion of less thickness than the width of said recess and loosely received in said recess and means including a pin received in said rim and extending through said root for supporting said blade, said root portion having a bore tapering in a single direction and said pin having a mating tapered portion received therein and slidably engaging said bore, said pin being disposed with the central axis of said tapered portion extending in a direction transverse to a radial line passing through said root.

2. A rotor having a rim, said rim having a radially outwardly opening recess formed therein, a radially extending blade having a root portion of less cross-sectional thickness than the width of said recess and slidably received in said recess and means including a pin received in said rim and extending through said root for supporting said blade, said root portion having opposite parallel surface portions and a tapered bore extending through one of said surface portions, said pin having only one tapered portion mating with and loosely received in said bore and permitting movement of said blade, and said pin being disposed with the central axis of said tapered portion extending in a direction transverse to a radial line passing through said root, whereby the centrifugal forces imposed on said blade are effective to urge the latter in said transverse direction.

3. A rotor structure having a rim portion, said rim having a pair of opposed wall surfaces spaced from each other and partly defining a radially outwardly facing recess, a blade having a root portion received in said recess and means including a pin received in said rim and extending through said root portion for attaching said blade to said rim, said root portion having opposite surface portions and a single conical bore extending therethrough, said opposite surface portions being spaced from each other to a lesser degree than the spacing between said wall surfaces, said pin having a mating conical portion received in said bore, the conical portion of said pin being smaller than said bore and permitting limited rotation of said blade about the axis of said pin, and said pin being disposed with the axis of said conical portion extending in a direction transverse to a radial line passing through said root, whereby the centrifugal forces imposed on said blade during operation are effective to urge the latter in said transverse direction and maintain one of said surface portions in frictional abutment with one of said wall surfaces.

4. A rotor structure for an axial flow machine having a rim portion, said rim portion having a pair of mutually opposed walls spaced from each other and partly defining a circumferential groove, an annular row of blades disposed about said rim, each of said blades having a root portion slidably received in said recess, said root portion having a pair of opposed surface portions, said opposed surface portions being spaced from each other to a lesser degree than the spacing between said walls, at least one of said surface portions being disposed parallel to a portion of the adjacent wall, and means including a pin received in said rim and extending through said root for attaching said blade to said rim, said blade being freely movable relative to said pin, said root portion having a bore tapering in one direction and said pin having a mating tapered portion received therein, said pin being disposed with the central axis of said tapered portion extending in a direction transverse to a radial line passing through said root portion.

5. A rotor structure for an axial flow machine having a rim portion, said rim portion having a pair of mutually opposed parallel walls spaced from each other and partly defining a radially outwardly facing circumferential recess, an annular row of blades disposed about said rim and extending radially outwardly therefrom, each of said blades having a root portion slidably received in said recess, said root portion having a pair of opposed outer surface portions, at least one of said surface portions being disposed parallel to a portion of the adjacent wall, said opposed surface portions being spaced from each other to a lesser degree than the spacing between said walls, and means including a pin engaging said rim and said root for attaching said blade to said rim, said root portion having a bore tapering in one direction and said pin having a single tapered portion, said tapered portion being received in said bore, said tapered bore being larger than said tapered portion, thereby permitting movement of said blade, said pin being disposed with the central axis of said tapered portion extending in a direction substantially normal to a radial line passing through said root portion.

6. A rotor structure for an axial flow machine having a rim portion, said rim portion having a pair of mutually opposed parallel walls spaced from each other and partially defining a circumferential groove, an annular row of blades disposed about said rim, each of said blades having a platform disposed adjacent said rim portion and a parallelepiped root portion slidably received in said recess, said root portion having a pair of opposed parallel outer surface portions in juxtaposed relation with said walls, said opposed surface portions being spaced from each other to a lesser degree than the spacing between said walls, and means including a pin received in said rim and engaging said root for attaching said blade to said rim portion, said root portion having a frusto-conical bore and said pin having a single frusto-conical portion, said frusto-conical portion being received in said bore, said pin being disposed with the central axis of said frusto-conical portion extending in a direction transverse to a radial plane extending in a direction normal to the axis of rotation of said rotor, said root portion being loosely received on said pin and said platform defining a clearance with said rim portion, thereby to provide freedom of movement to said blade, said blade being urged by centrifugal forces, when in operation, in a direction parallel to the axis of said pin to effect abutment of one of said walls with one of said surface portions.

References Cited in the file of this patent

UNITED STATES PATENTS

| | | |
|---|---|---|
| 1,545,495 | Holzwarth | July 14, 1925 |
| 2,819,869 | Meyer | Jan. 14, 1958 |

FOREIGN PATENTS

| | | |
|---|---|---|
| 312,864 | Italy | Nov. 28, 1933 |
| 621,315 | Great Britain | Apr. 7, 1949 |